June 3, 1952        W. RODDER        2,599,414
ADJUSTABLE ROLL SUPPORT
Filed May 24, 1946        2 SHEETS—SHEET 1
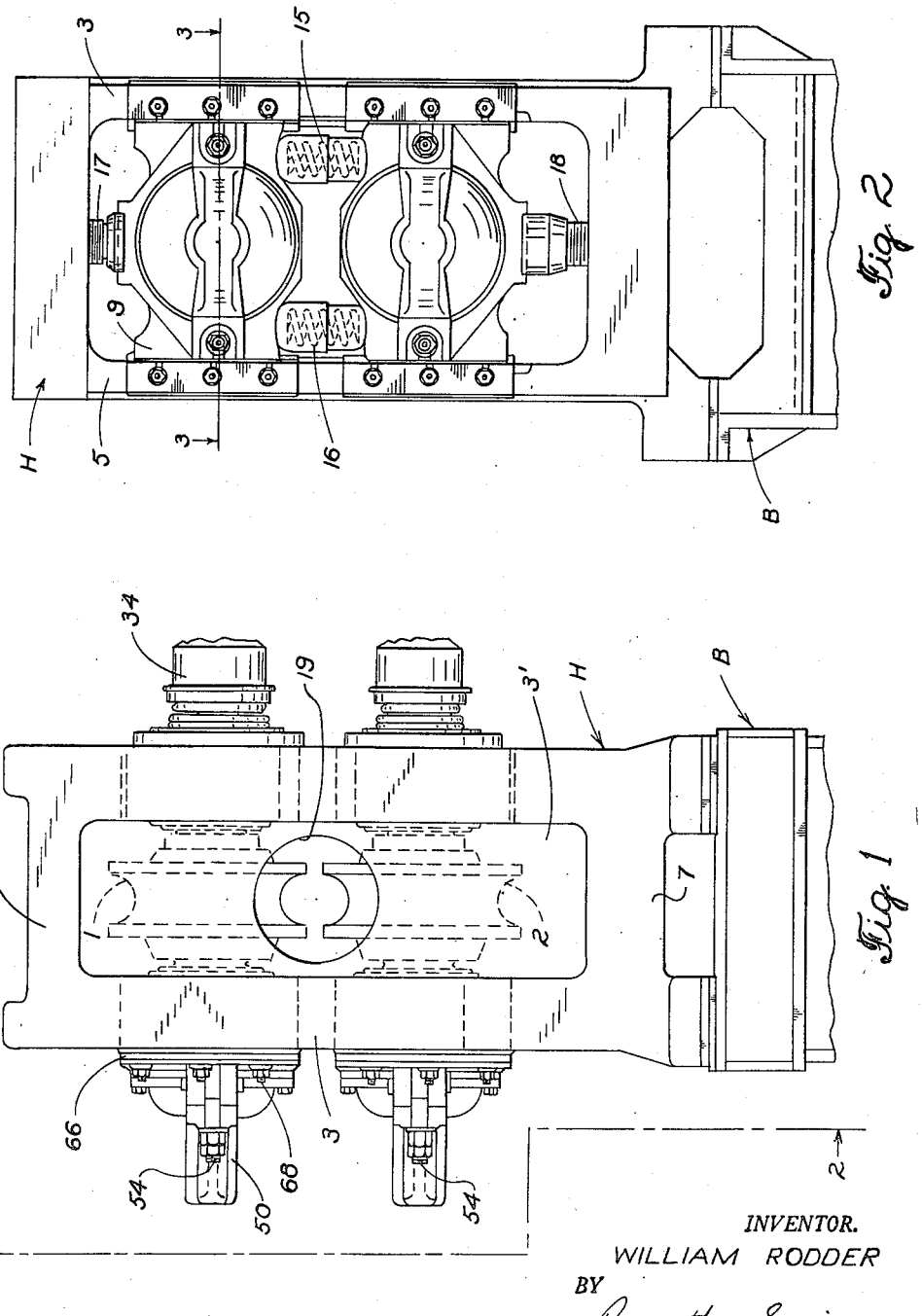
INVENTOR.
WILLIAM RODDER
BY
ATTORNEYS June 3, 1952 W. RODDER 2,599,414
ADJUSTABLE ROLL SUPPORT
Filed May 24, 1946 2 SHEETS—SHEET 2

INVENTOR
WILLIAM RODDER
BY
Bosworth & Sessions
ATTORNEYS

Patented June 3, 1952

2,599,414

UNITED STATES PATENT OFFICE 2,599,414

ADJUSTABLE ROLL SUPPORT

William Rodder, Youngstown, Ohio, assignor to The Aetna-Standard Engineering Company, Youngstown, Ohio, a corporation of Ohio Application May 24, 1946, Serial No. 672,108

3 Claims. (Cl. 80—56)

This invention relates to roll supporting mechanism and more particularly to an improved adjustable roll support or mount for tube sizing machines or other metal forming rolling mills. It is usual practice in the metal rolling art to provide a mill composed of a number of roll stands, each stand having a pair of rolls. In operation these pairs of rolls are aligned and set so that each succeeding pair of rolls imparts a further reduction to the tube or the like which is being rolled. Such mills are usually designed to handle various sizes of tubes and this necessitates changing the rolls when it is desired to change to a new size. Also, when rolls become worn they must be replaced and each time that a single roll is changed, or the entire mill is changed over to a new size, the various rolls involved must be realigned to provide a proper roll pass.

An important object of the present invention is the provision of an adjustable roll mount which will permit accurate adjustment of a roll, in a direction axially of the roll shaft, after the roll has been positioned in the housing or frame. Other objects of my invention include: the provision of an adjustable roll mount which includes anti-friction bearings of the ball or roller type and provides a unitary assembly which may easily be removed from and installed in a roll housing; the provision of an adjustable roll mount assembly wherein the axial position of the roll and shaft may be accurately adjusted to and locked in any desired position; provision of an adjustable roll mount assembly which can readily be dismantled and reassembled when it is desired to replace a roll; and the provision of simple, rugged, and compact adjustable unitary roll mount of the type described.

The above and other objects of my invention will appear from the following description of one embodiment thereof reference being had to the accompanying drawings in which:

Figure 1 is an end elevation of a roll housing or stand and a pair of rolls supported therein on my improved roll mounts.

Figure 2 is a side elevation, taken on line 2—2 of Figure 1.

Figure 3:
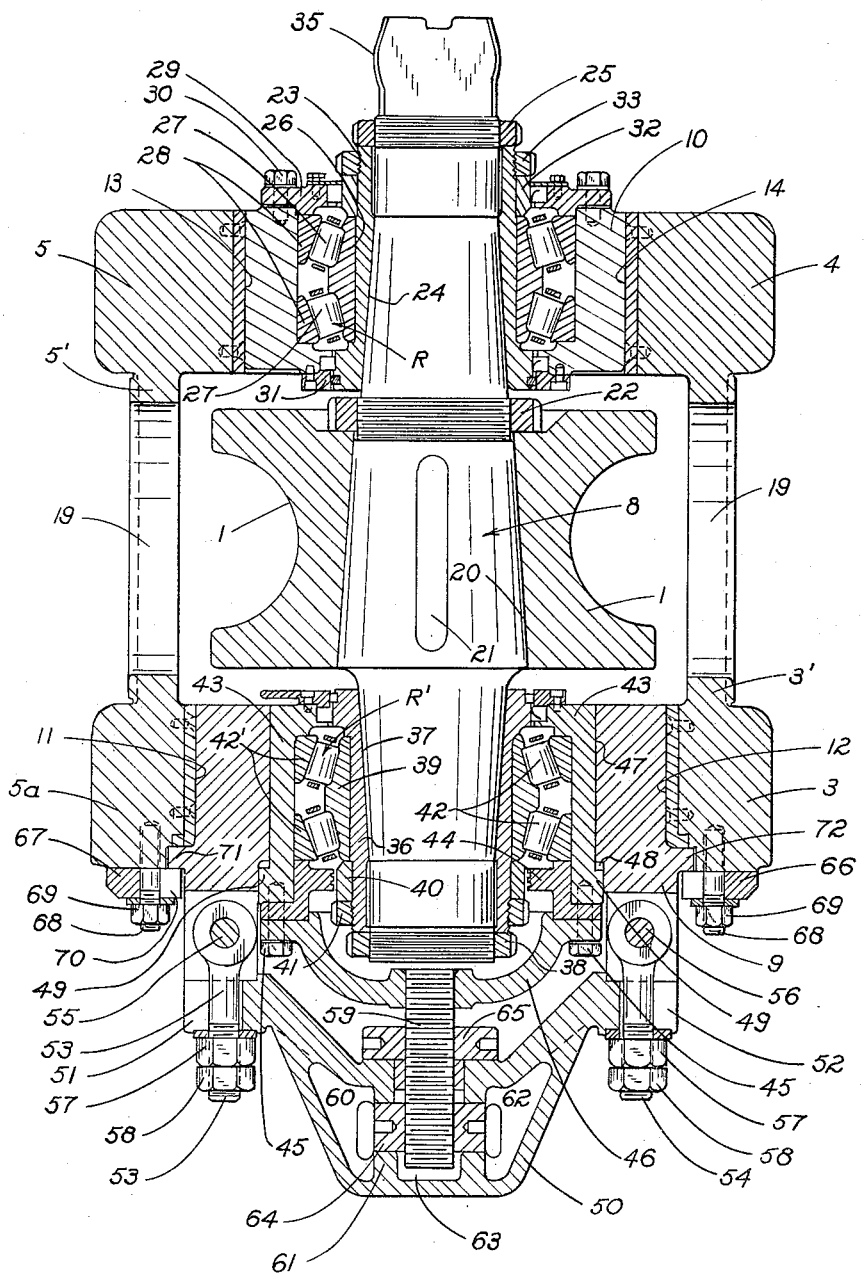
Figure 3 is an enlarged horizontal cross sectional view, taken on line 3—3 of Figure 2, and showing the details of my improved adjustable roll mount assembly.

In Figure 1 I have illustrated rather diagrammatically a roll housing or supporting frame H which is mounted on a suitable base B. The housing H supports a pair of rolls 1 and 2 and each of these rolls is included in one of my adjustable roll mount assemblies. It will be understood that certain usual auxiliary mechanisms which are normally associated with a roll stand or housing, such as adjusting screw operating means, etc., are omitted as they form no part of the present invention. The housing H includes a pair of vertical guide members 3 and 4 which form a slotted aperture and provide a guideway in which the roll mount assemblies are supported. A similar set of vertical guide members, 5 and 5ª, on the opposite side of the housing H, forms another guideway for the roll mounts. The guides 3 and 4 are connected at their upper ends by a transversely extending member 6 and at their lower ends by a similar member 7. Identical members, not seen in the drawings, connect the guides 5 and 5ª to form a rigid housing structure.

As each of the adjustable roll assemblies is identical, it will suffice to describe only one of them in detail. In Figure 3 the roll 1 is mounted on a shaft 8 which in turn is supported, through anti-friction bearings which will be later described, by bearing blocks 9 and 10. As is seen in Figures 2 and 3, the bearing blocks 9 and 10 have parallel end faces which are indicated at 11 and 12 for block 9 and at 13 and 14 for block 10. The vertical guide members 3 and 5ª of the housing H form guideways for the block 9 and the guide members 4 and 5 form similar guideways for the block 10.

The bearing blocks are slidable vertically in these guideways and thus permit the rolls 1 and 2 to be moved toward or away from each other into the desired position of adjustment. Spring units 15 and 16 are preferably disposed between the bearing blocks of the rolls 1 and 2 and tend to hold the rolls apart and adjusting screws 17 and 18 are adapted to engage the bearing blocks of the rolls 1 and 2 to move the rolls together against the pressure of the separating springs 15 and 16.

It will be understood an additional set of springs, similar to units 15 and 16, will be positioned between the bearing blocks at the opposite ends of the roll shafts from those seen in Figure 2. Furthermore, it will be understood that any suitable means, not shown, may be provided for rotating the adjusting screws 17 and 18. Adjustment may be either manual or power operated and may be simultaneous and independent.

A web 3' extends between the guide members 3 and 4 and a similar web 5' between guides 5 and 5ª. These webs are provided with apertures 19 in alignment with the pass line of the rolls 1 and 2. When the mill is in operation bell mouth units of proper size to accommodate the tube being rolled may be supported in the openings 19 to guide the tube as it enters and leaves the rolls.

Referring now to Figure 3, the roll 1 has a tapered bore which fits on a tapered portion 20 of the shaft 8. A key 21 prevents relative rotation of the shaft and roll and a nut 22 holds the roll in position. A bearing mount sleeve 23 engages the tapered end section 24 of the shaft and is held in position by a nut 25. The inner race 26 of a roller bearing R is mounted on the sleeve 23, the rollers being indicated at 27 and the outer race at 28. This outer race has a close fit in the bearing block 10 and is also held in position by an end flange 29 which is secured to the block 10 by the screws 30. Another flange 31 is secured to the inner face of the block 10 and suitable lubricant seals may be incorporated in the flanges 29 and 31. The inner race 26 of the roller bearing is held in place on the sleeve 23 by a ring 32 and nut 33. A driving connection for the shaft 8 is provided through a suitably coupling 34 (Figure 1) which engages the shaft end 35 and is connected to any suitable source of power for driving the roll.

From the above description it will be seen that the roller bearing R is fixed on the shaft 8 and its outer race 28 is rigidly mounted in the bearing block 10. Thus the shaft 8 may have rotational movement only relative to the block 10, axial movement of the shaft relative to block 10 being prevented by the double row roller bearing illustrated.

At the opposite end of shaft 8 a bearing mount sleeve 36 is held on the tapered section 37 of shaft 8 by a nut 38 and the inner race 39 of a roller bearing R' is held in place on the sleeve 36 by ring 40 and nut 41. Rollers 42 are disposed between the inner race 39 and the outer race 42' of bearing R' and the outer race is carried by a cylindrical housing sleeve 43. A retaining ring 44 clamps the outer race 42' in position in the sleeve 43 and is held in place by screws 45 which also secured the end cap 46 in position. This cap 46 covers and encloses the end of the shaft 8, and it will be observed that the shaft is rotatable on the bearing R' within the housing sleeve 43 but is not movable axially relative to the housing sleeve 43.

The bearing block 9 is bored at 47 to provide a sliding support for the sleeve 43. The bore 47 is enlarged at 48 to accommodate a flange 49 which is formed on the outer end of the sleeve 43. This flange coacts with the end of the enlargement 48 to limit axial sliding movement of the sleeve 43 in the bore 47 in an inward direction (upwardly as seen in Figure 3).

Extending across the outer end of the block 9 is a removable yoke 50 which has slotted ends 51 and 52 and is secured in position on the block 9 by screws 53 and 54. These screws 53 and 54 are pivotally attached to the block 9 at 55 and 56 respectively and nuts 57 and lock nuts 58 serve to clamp and hold the yoke 50 in the position shown in Figure 3.

In order to adjust the position of the sleeve 43 in the bearing block 9 and thus to adjust the roll 1 and shaft 8 axially in the housing H, an adjusting screw 59 is secured to and supported by the end cap 46. Yoke 50 is provided with a cross bar 60 and an inwardly extending boss 61 and the screw 59 extends through an opening 62 in the cross bar 60 and may project into the opening 63 in the boss 61. To move the screw 59 axially relative to the yoke 50 and block 9 an adjusting nut 64 is provided on the screw 59 between the cross bar 60 and the boss 61. It will be noted that when the nut 64 is rotated in one direction the screw 59, end cap 46, sleeve 43, bearing R', shaft 8, and roll 1 will all be moved in one direction relative to the block 9 and, when the nut 64 is turned in the opposite direction, this assembly, including the roll 1, will be moved in the opposite axial direction relative to the block 9. A lock nut 65 may be tightened up against the inner side of the cross bar 60 to lock the screw 59 in any desired position of adjustment.

The block 9 is secured in the slideway formed by the vertical guides 3 and 5$^a$ by means of retaining plates 66 and 67. These plates are held in position by studs 68 and nuts 69 and are preferably slotted as seen at 70 to facilitate their installation and removal. The plates 66 and 67 engage flanges 71 and 72 on the block 9 and prevent axial movement of the block 9 in the housing H while permitting vertical movement of the block in the slideway formed by the guides 3 and 5$^a$. Block 10, however, may have both vertical and axial movement in the slideway formed by guides 4 and 5 of housing H. It will be understood that where the term "axial" is used in this specification and in the appended claims it refers to a direction parallel to the axis of rotation of the roll and roll shaft included in one of my improved adjustable roll support units.

When a pair of rolls is to be set up in the housing or stand H, the rolls are first assembled into my adjustable roll support units each comprising a roll, shaft, bearings and bearing blocks, together with the adjusting mechanisms described above. These unitary assemblies are placed in the vertical slideways of the housing H and adjusted for proper vertical location and spacing of the rolls. In order to align the grooves in the rolls, after the units have been set up and secured in position by means of the retaining plates 66 and 67, one roll, for example the bottom roll of the pair, will be locked against axial movement and the top roll adjusted axially by means of the apparatus described herein until the roll grooves are properly aligned. The top roll is then locked in adjusted position by tightening its nut 65.

Where there are a series of roll stands each supporting a pair of rolls, it will be necessary to align the rolls of each stand with those of the other stands and also align the grooves in the rolls making up each pair. This adjustment is facilitated by my independently adjustable roll mount units and it will be seen that the present development provides a roll mount using antifriction roller or ball bearings which can be axially adjusted while positioned in a housing or stand without changing the location of the roll on the shaft and without changing the fixed position of the bearings on the shaft. My unitary roll support assemblies may readily be removed from the housing without disturbing other rolls carried by the housing. After removal of a unit a new roll can be placed on the shaft by merely removing the sleeve 23 and the parts carried thereby (bearing R and block 10), installing a new roll on the tapered portion 20 on the shaft, and replacing sleeve 23 and associated parts.

Thus the adjustable end of the assembly need not be dismantled to change rolls. Approximate adjustment of the position of the roll between the spaced bearing blocks 9 and 10 can be made before the assembly is positioned in the housing H and final accurate axial adjustment of the roll accomplished after assembly in the housing.

Although I have described the illustrated embodiment of my invention in considerable detail, it will be understood that variations and modifications may be made in the form and arrangement of parts making up my improved adjustable roll support assembly. Furthermore, although the rolls are illustrated as mounted in a housing with their axes horizontal, they could be mounted with their axes vertical or inclined at any intermediate angle. The housing or stand may take any desired form and may be provided with any suitable means for adjusting the rolls toward and away from each other in a direction normal to their axes of rotation. I do not, therefore, wish to be limited to the particular apparatus herein shown and described but claim as my invention all embodiments thereof coming within the scope of the appended claims.

I claim:

1. Adjustable roll supporting apparatus including a roll shaft, anti-friction bearings mounted on said roll at the opposite end portions thereof, a roll removably mounted on said shaft between said bearings, bearing blocks for said bearings, one of said blocks being secured in axially fixed relation to one of said bearings, a sleeve member secured in axially fixed relation to the other bearing and having an axially sliding fit in the other of said blocks, means for adjusting the position of said sleeve axially relative to said other of said blocks, a frame structure engaging and supporting said bearing blocks, and detachable means for holding said other of said blocks against axial movement in said frame while permitting vertical movement therein.

2. A roll mounting of the type described comprising a shaft, a roll removably secured on said shaft for rotation therewith, anti-friction bearings on said shaft on opposite sides of said roll, said bearings each having outer race members and inner race members and anti-friction elements therebetween, a bearing block secured to the outer race of one of said bearings, a sleeve member secured to the outer race of the other of said bearings, a second bearing block, said sleeve member having a sliding fit in a bore in said second block, and means for adjusting the position of said sleeve in the bore of said second bearing block whereby said shaft, roll and first named bearing block are simultaneously moved relative to said second bearing block.

3. An adjustable roll support including in combination, a supporting frame having spaced apertures for receiving roll bearing blocks, a shaft, a roll mounted on said shaft between the ends thereof, an anti-friction bearing mounted at one end of said shaft, a bearing block carried by said bearing, said shaft being rotatable on said bearing within said block and said block having a sliding fit in one of said apertures in said frame, a second anti-friction bearing mounted on the opposite end of said shaft, a housing sleeve surrounding said bearing and carried thereby, said shaft being rotatable on said second bearing within said sleeve, a second bearing block having an internal bore in which said sleeve has a sliding fit, said second bearing block having a sliding fit in the other of said apertures in said frame, a flange on said second bearing block adapted to engage said frame and limit movement of said blocks and shaft in axial direction relative to said frame, an end cap secured to said housing sleeve and extending across the end of the shaft, a screw carried by said end cap, a yoke member detachably mounted on said second block, said screw extending into an aperture in said yoke, an adjusting nut having threaded engagement with said shaft and supported in said yoke whereby rotation of said nut will move said sleeve, shaft, and first named bearing and its block axially relative to said second block and frame, and means for restraining said second block against axial movement in said frame.

WILLIAM RODDER.

REFERENCES CITED

The following references are of record in the file of this patent:

UNITED STATES PATENTS

| Number | Name | Date |
| --- | --- | --- |
| 1,924,333 | Talbot | Aug. 29, 1933 |
| 2,175,783 | Rose | Oct. 10, 1939 |
| 2,363,656 | Dawson | Nov. 28, 1944 |

FOREIGN PATENTS

| Number | Country | Date |
| --- | --- | --- |
| 498,086 | Great Britain | Jan. 3, 1939 |

OTHER REFERENCES

Rolling Mill Journal, January 1931, pages 30 and 31.